UNITED STATES PATENT OFFICE.

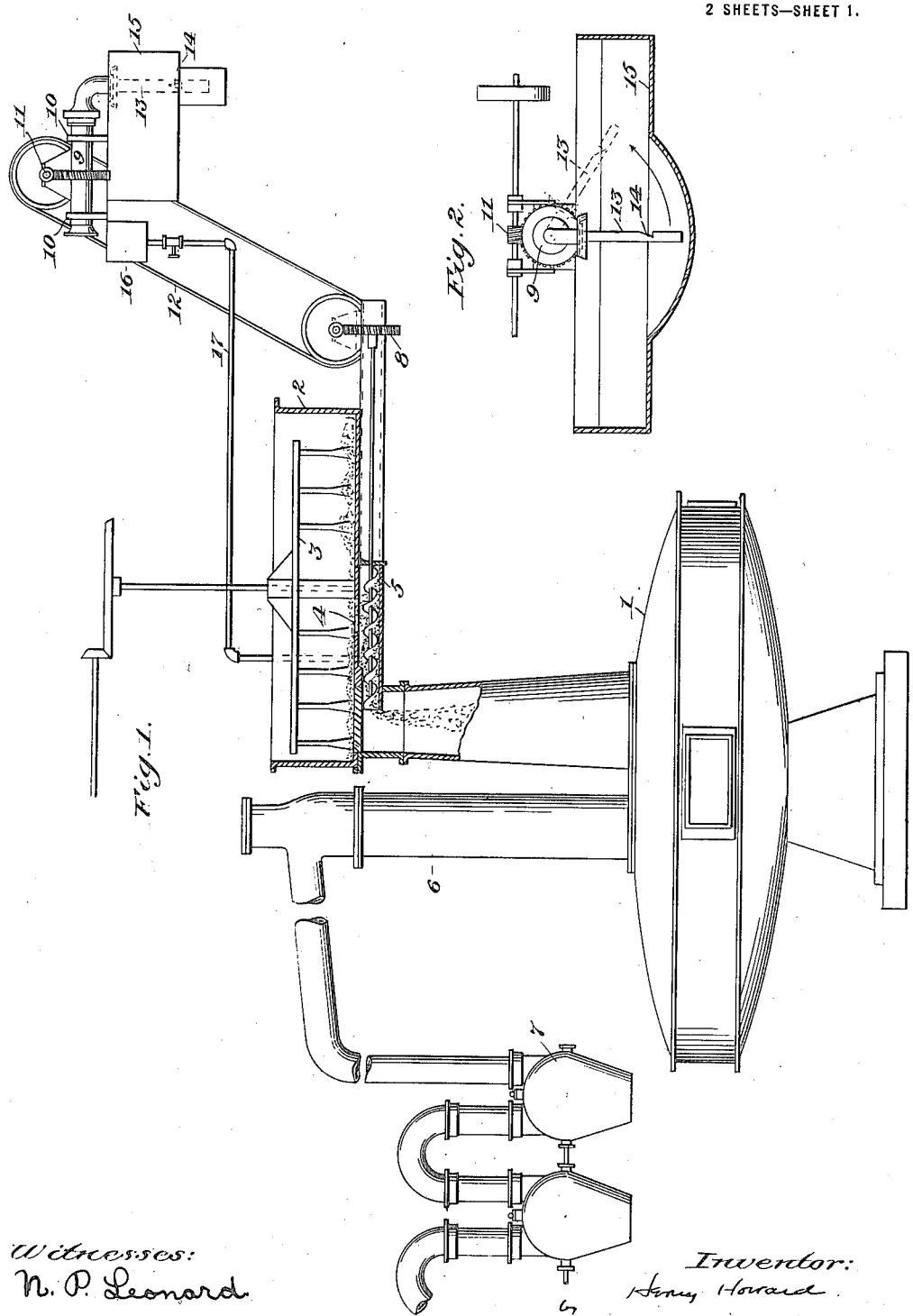

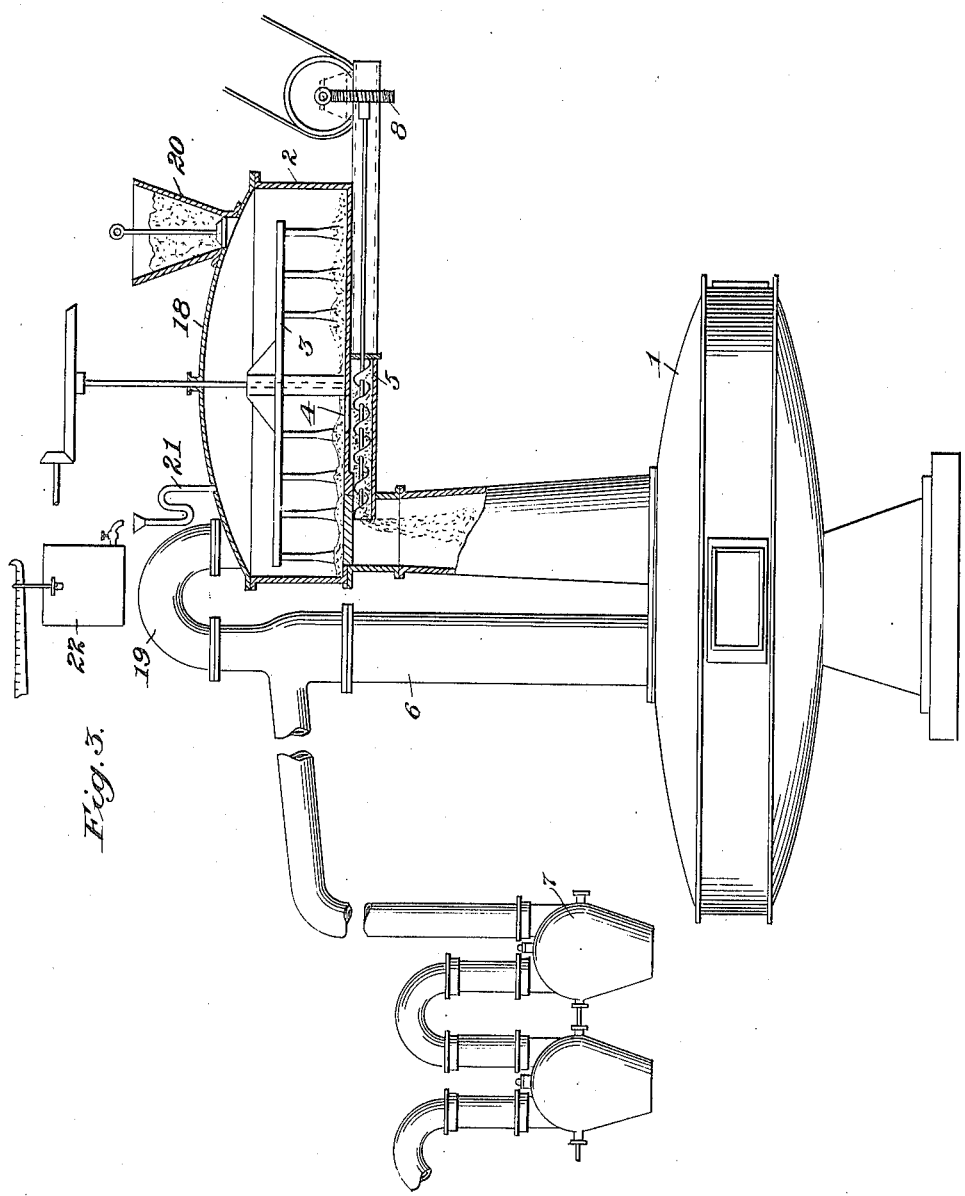

HENRY HOWARD, OF BROOKLINE, MASSACHUSETTS.

APPARATUS FOR MAKING HYDROCHLORIC ACID.

1,145,897.  Specification of Letters Patent. Patented July 13, 1915.

Application filed June 26, 1914. Serial No. 847,499.

*To all whom it may concern:*

Be it known that I, HENRY HOWARD, a citizen of the United States, residing at Brookline, in the county of Norfolk and State of Massachusetts, have invented certain new and useful Improvements in Apparatus for Making Hydrochloric Acid, of which the following is a specification.

This invention relates to apparatus for making hydrochloric acid in mechanical salt-cake furnaces, the object of the invention being to provide an apparatus by means of which the salt (sodium chlorid) and sulfuric acid, in the form of partially decomposed reaction mixture or paste, may be fed continuously and at a uniform rate to the mechanical furnace.

In the manufacture of hydrochloric acid by the decomposition of salt by sulfuric acid in mechanical salt-cake furnaces, it is customary to feed the salt and sulfuric acid separately to the furnace, the evolved gaseous hydrochloric acid being absorbed by water in a suitable absorption train. I have found that decided economies in the operation are secured by commingling the salt and acid in accurately predetermined proportions before their introduction into the furnace, and continuously feeding the mixture, in the form of a partially decomposed paste, to a suitable mechanical furnace in which it is stirred and calcined to complete the reaction. By proceeding in this way, a nearly instantaneous reaction is obtained in the furnace, particularly when the salt is in the form of fine powder, and by feeding the paste continuously and uniformly to the furnace at a rate commensurate with its capacity, there is obtained a copious and uniform evolution of hydrochloric-acid gas under conditions highly favorable for economic operation. This procedure has been found materially to increase the capacity of the furnace, as compared with the results obtainable under the prior practice of separately feeding the salt and acid, and also to render it entirely feasible to carry out the whole operation on a single hearth of the Mannheim type. It is necessary, however, under the present procedure to provide not only for the absorption of the gas evolved by the reaction in the furnace, but also for the absorption of the lesser quantities of gas evolved from the reaction mixture or paste before its admission to the furnace.

It is essential to the successful operation that the salt and acid should be delivered to the furnace in the form of a mixture of uniform composition, the components of the mixture being in absolutely controlled relative quantities. Under these conditions, and in a furnace of the type described, the mixture is fed to a hearth which carries a large quantity of highly heated and nearly dry sulfate of soda, with the result that the furnace charge as a whole does not at any time assume a liquid or pasty condition, and the reaction may be carried to completion in a single step or stage. This uniformity in the composition of the mixture is secured either by coördinating the feed of the salt and acid to a suitable mixing device in such manner that these feeds vary proportionately in so far as they vary at all, or by introducing the salt and acid in proper weighed proportions into a suitable mixing device, in which they are thoroughly commingled before their introduction into the furnace.

A preferred form of apparatus embodying the invention is illustrated in the accompanying drawings, wherein—

Figure 1 is an elevation of the apparatus, partly in section; Fig. 2 is a transverse vertical section of the acid feeding device; and Fig. 3 is an elevation, partly in section, of a modified form of apparatus.

In said drawings, 1 represents, diagrammatically, a single-hearth mechanical salt-cake furnace of the Mannheim type, which in practice is provided with the usual stirring means and is constructed for continuous operation.

2 is the salt pan, provided with a rotary feeding mechanism 3, and discharging through the bottom outlet 4 into a conveyer 5 which leads directly to the furnace 1. The gases evolved from the furnace pass through the standard 6 to a suitable absorption train 7. The conveyer 5 is shown as operated by means of a worm-gear 8.

In the apparatus illustrated, sulfuric acid in the required proportion to the salt is fed in successive equal portions to the conveyer 5 at a point between the salt pan and the mechanical furnace. A suitable mechanism for feeding the acid in this manner comprises a horizontal cylinder 9 of acid-proof ware, revolubly mounted in bearings 10 and slowly rotated by a worm-gear 11, the arrangement being such that the conveyer 5 and the cylinder 9, interconnected through the belt 12, are always driven in synchronism. The cylinder 9 carries at one end a dipping-tube 13 which revolves in a vertical plane in the direction indicated by the arrow in Fig. 2. This tube is closed at its outer end and is provided on its advancing side with an aperture 14, which is preferably angular, and which extends to, but not beyond, the central line of the tube. This tube discharges into the cylinder 9 as it reaches the horizontal position in its movement of rotation, and delivers equal quantities of acid at each revolution, irrespective of the depth of acid in the tank 15, provided only enough acid be present to fill the cup end of the tube in its lowermost position. The acid is discharged at each revolution into a small receiving vessel 16, whence it is carried by pipe 17 to the conveyer 5. By operating the dipping-tube in synchronism with the mechanical conveyer for the salt, and properly proportioning the capacity and rate of revolution of the tube to the capacity of the conveyer, it is practicable to deliver the proper mixture of salt and acid to the furnace under all conditions and at a controllable rate.

The acid-feeding device as above described, is claimed in my copending application Serial No. 848,457 filed July 1, 1914. Instead of this particular form of acid feed, I may employ other devices capable of accomplishing a like result.

In the operation of this apparatus, the pan 2 serves as a storage receptacle for the salt and the conveyer mixes the salt and acid to a substantially uniform paste, while the body of fine salt in the pan and in the rear of the conveyer acts as an effective seal to prevent any escape of the gaseous hydrochloric acid. The gas set free by the partial decomposition occurring in the conveyer, passes into the furnace with the partially decomposed mixture, and thence, together with the reaction gases from the furnace, to the absorption train 7.

The invention is not restricted to the employment of the particular apparatus illustrated. For example, if desired, I may supply salt and acid in weighed proportionate quantities directly to the pan 2 which in such case, should be constructed of a material resistant to hydrochloric acid, properly covered, and piped to the absorption system. Or, if desired, I may introduce into the pan a mixture of sodium chlorid and acid sodium sulfate, the latter in smaller proportion than is required for the decomposition of the sodium chlorid, the required amount of sulfuric acid to complete the decomposition of the salt being either fed to the mixture on its way to the furnace or introduced in weighed portions into the mixing pan, as above described.

A closed-pan apparatus of the type above referred to is illustrated in Fig. 3. In this apparatus, the mechanical furnace and the absorption train are provided, as in Fig. 1. The mixing-pan 2 is provided with a cover 18, and a gas connection 19 leads directly to the absorption train 7. The salt, or mixture of salt with acid sodium sulfate, is supplied to this pan in successive weighed quantities through a hopper 20, having a suitable closure. The acid, in the required weighed amounts, is fed in through a sealed inlet pipe 21 from the weighing-vessel 22. The salt and acid are thoroughly mixed in the pan and also in the conveyer 5 without external heating, and are continuously transferred by the conveyer 5 to the furnace 1.

The process herein described is claimed in my copending application Serial No. 847,500, filed June 26, 1914.

I claim:—

1. In apparatus for making hydrochloric acid, an absorption system for hydrochloric acid gas, a sealed mixing device communicating therewith, means for supplying salt and sulfuric acid to said mixing device in the necessary predetermined proportions, a suitable single-stage mechanical salt-cake furnace also connected to the absorption system, and means for continuously delivering the mixture to said furnace.

2. In apparatus for making hydrochloric acid, an absorption system for hydrochloric-acid gas, a sealed mixing device communicating therewith, coördinated means for supplying salt and sulfuric acid to said mixing device in the necessary predetermined proportions, a suitable mechanical salt-cake furnace also connected to the absorption system, and means for continuously delivering the mixture to said furnace.

3. In apparatus for making hydrochloric acid, an absorption system for hydrochloric acid gas, a mixing device communicating therewith and adapted to be sealed by a bed of salt, coördinated means for supplying salt and sulfuric acid to said mixing device in the necessary predetermined proportions, a suitable mechanical salt-cake furnace also connected to the absorption system, and means for continuously delivering the mixture to said furnace.

4. In apparatus for making hydrochloric acid, an absorption system for hydrochloric acid gas, a storage vessel for salt provided with feeding means, a mechanical salt-cake furnace, a salt-conveyer leading from said storage vessel to said furnace and constructed to be sealed by the salt in said vessel, means for introducing predetermined quantities of sulfuric acid into said sealed conveyer, means for coördinating the supply of salt and acid to maintain the necessary predetermined proportions, and a conduit for hydrochloric acid gas extending between said furnace and absorption system.

In testimony whereof I affix my signature in presence of two witnesses.

HENRY HOWARD.

Witnesses:
   THOS. J. SHANNON,
   M. V. O'BRIEN.